United States Patent [19]

Compeau et al.

[11] Patent Number: 4,598,932
[45] Date of Patent: Jul. 8, 1986

[54] CONTROL MEANS FOR OCCUPANT RESTRAINT BELT SYSTEM

[75] Inventors: Michael E. Compeau, Fraser; Lloyd W. Rogers, Utica, both of Mich.

[73] Assignee: General Motors Corporation, Detroit, Mich.

[21] Appl. No.: 730,507

[22] Filed: May 6, 1985

[51] Int. Cl.[4] .............................................. B60R 22/34
[52] U.S. Cl. .................................... 280/807; 280/803; 180/289
[58] Field of Search ................ 280/803, 807; 180/289; 74/480 R, 481, 482

[56] References Cited

U.S. PATENT DOCUMENTS 3,692,328 9/1972 Arlauskas ............................ 280/803
3,727,943 4/1973 Augunas .............................. 280/803

Primary Examiner—John J. Love
Assistant Examiner—Karin L. Ferriter
Attorney, Agent, or Firm—Herbert Furman

[57] ABSTRACT

A control means for a restraint belt retractor includes a latch bolt sensor directly actuating the disabling means of the retractor and movable between actuated and unactuated positions. The sensor is normally located in unactuated position in the path of movement of the latch bolt when the latch bolt is in latched position. As the latch bolt moves to unlatched position it engages the sensor and moves it to actuated position. The sensor is connected to an operating lever of the door latch through a lost motion connection. This connection provides an operative connection to the operating lever when the sensor is in the unactuated position and provides a free wheeling connection when the sensor is in an actuated position. This permits the inside and outside operators, which operate the operating lever, to be released and to free wheel relative to the sensor when the sensor is in actuated position.

3 Claims, 5 Drawing Figures

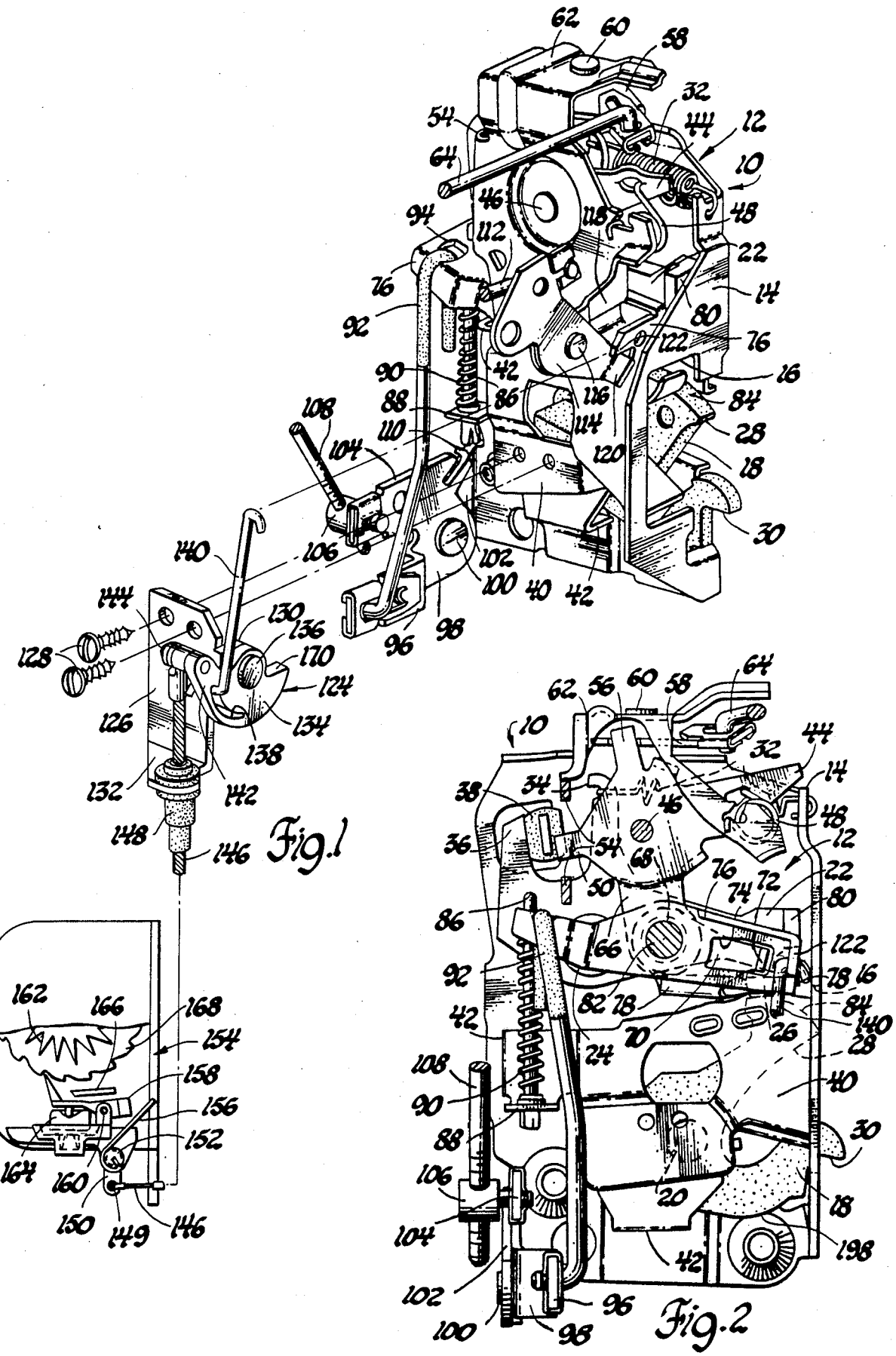

CONTROL MEANS FOR OCCUPANT RESTRAINT BELT SYSTEM

This invention relates generally to a control means for an occupant restraint belt system and more particularly to a control means for disabling door mounted retractors of an occupant restraint belt system upon opening movement of the door to enable freedom of occupant egress and ingress.

Control means for disabling door mounted retractors of an occupant restraint belt system are known. U.S. Pat. No. 3,727,943 Augunas et al, Occupant Restraint System, and No. 3,692,328 Arlauskas et al, Control Means for Occupant Restraint Belt Retractor, disclose control means for temporarily disabling a door mounted retractor when either the inside or outside operator or door handle is actuated and for maintaining the disablement when the door is in an open position. Temporary disablement is obtained upon actuation of the inside and outside handles. The disablement is maintained, even though the inside or outside handle is released, when the latch bolt is unlatched from the striker.

U.S. application Ser. No. 723,438 Control Means for Occupant Restraint Belt System, Espinoza et al, filed Apr. 15, 1985, discloses a control means which includes a cable means for actuating the disabling means of a door mounted restraint belt retractor. The cable means is controlled by a cable actuating lever which is operatively coupled to the operating lever of the door either the inside or outside operator. A blocking lever is carried by a latch bolt position sensor and is biased toward blocking position with respect to the cable operating lever. The latch bolt sensor holds the blocking lever in unblocking position when the bolt is in a latched position and permits the blocking lever to move to blocking position to maintain disablement of the retractor as the bolt moves to unlatched position. Disablement of the retractor temporarily occurs whenever the inside or the outside operator is actuated. The temporary disablement is maintained only when the latch bolt is in an unlatched position.

The control means of this invention includes a latch bolt position sensor which actuates the disabling means of the retractor. The sensor is located in an unactuated position in the path of movement of the latch bolt when the latch bolt is in a latched position. The sensor is connected to the inside and outside operators through a lost motion connection. The lost motion connection connects the sensor to each of the operators when the sensor is in the unactuated position so that operation of either of the operators temporarily moves the sensor to an actuated position wherein the sensor actuates the disabling means of the retractor. Should operation of the operator release the latch bolt for movement toward unlatched position, the latch bolt will maintain the sensor in actuated position to maintain actuation of the disabling means of the retractor. When the sensor is in the actuated position, the lost motion connection provides free wheeling between the sensor and each of the operators.

Thus, upon release of the latch bolt by operation of either of the operators, the retractor is temporarily disabled through movement of the sensor to actuated position. This disablement is maintained, even if the operator is released, by movement of the latch bolt toward an unlatched position.

One feature of this invention is that it provides an improved control means for an occupant restraint belt system which includes a movable latch bolt sensor actuating the disabling means of the retractor upon movement of the sensor by either the inside or outside operator with the sensor being connected to or free wheeling relative to the inside and outside operators in accordance with the position of the latch bolt of the door latch. Another feature is that a lost motion connection is provided between the sensor and the inside and outside operators, with the lost motion connection being operative when the latch bolt sensor is in an unactuated position and the latch bolt is in a latched position and being free wheeling when the latch bolt sensor is in an actuated position and the latch bolt is in an unlatched position.

These and other features will be readily apparent from the following specification and drawings wherein:

FIG. 1 is an exploded perspective view of a vehicle door latch and control means according to this invention with the latch bolt of the door latch being in unlatched position.

FIG. 2 is a partially broken away view of the door latch of FIG. 1.

Figure 3:
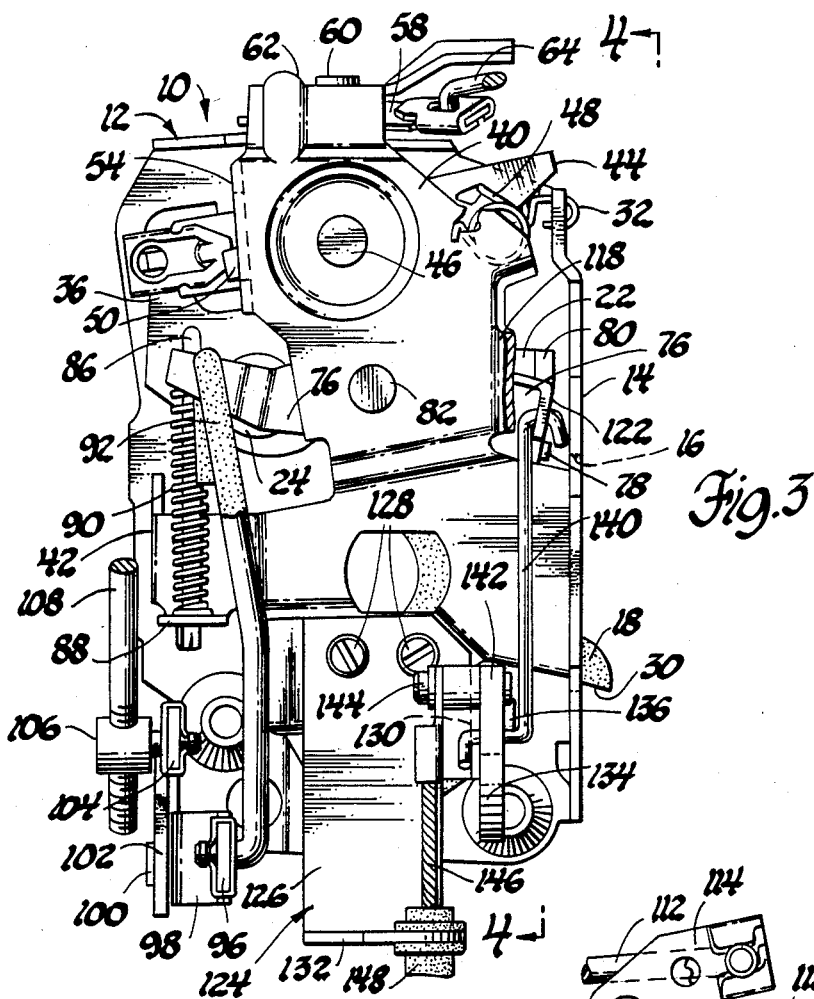
FIG. 3 is a view of the assembled door latch and control means of FIG. 1.

The vehicle door latch 10 shown in FIGS. 1 through 5 of the drawings is substantially the same as a latch which has been widely used in present and previous production vehicles manufactured by the Assignee of this invention. In view of the widespread use of the latch, the details thereof are well known and therefore only a brief description of the operating components will be given.

The latch 10 includes a frame 12 having an integral side wall or flange 14, with the frame and side wall being apertured at 16 to provide for entrance and exit of a headed striker pin, not shown. The striker pin is mounted on the vehicle lock pillar. A plastic coated fork type bolt 18 is pivoted at 20 to the frame 12. The bolt is shown in the unlatched position in FIGS. 1 through 4 and in the latched position in FIG. 5. A detent 22 is pivoted at 24, FIG. 2, to the frame 12 and includes a foot or shoulder 26 which is engageable with either a shoulder 28 or a shoulder 30 of the bolt 18 to hold the bolt respectively in either intermediate latched or fully latched position. A tension spring 32 is hooked between a leg 34 of the detent and the flange 14 of the frame to continually bias the detent 22 clockwise as viewed in FIG. 2 towards engaged position with the bolt 18. The detent 22 is located against the bias of spring 32 by the engagement of a leg 36 thereof with a rubber bumper 38 secured to a lanced lateral tab of frame 12.

A back plate 40 is spaced from the frame 12 and includes lateral tabs 42 which are staked to the frame 12 to secure the back plate thereto. A locking lever 44 is pivoted to a pin 46 extending between frame 12 and the back plate 40. An overcenter spring 48 is hooked between the locking lever 44 and the back plate 40 to selectively and alternately bias the locking lever to unlocked position, as shown, or to a locked position clockwise of this position. The locking lever 44 is alternately located in each position by respective engagement of a leg 50 thereof with the lower and upper edges of a U-shaped slot provided in a lateral tab 54 of the back plate 40. Another leg 56 of the locking lever extends upwardly and is trapped in a slot of an auxiliary lever 58 which is pivoted at 60 to a rib reinforced flange 62 of the back plate. The lever 58 is connected by a rod 64 to a conventional outside key cylinder to move the locking lever between locked and unlocked positions.

An offset leg 66 of the locking lever 44 is pivoted at 68, FIG. 2, to one leg of a U-shaped intermittent member 70. This leg includes a lateral tab 72 which extends through an arcuate slot 74 of an operating lever 76 for a purpose to be described. The other leg 78 of the intermittent member extends toward flange 14 and is movable into and out of abutting relationship to the lower edge of a lateral tab 80 of the detent 22. The operating lever 76 is pivoted at 82 to the back plate 40. The pivot 82 is coaxial with the pivot 68 when the locking lever is in unlocked position.

When the locking lever is in its unlocked position, as shown, the leg 78 of the intermittent member 70 is in abutting relationship to the lower edge of the tab 80 of the detent 22, FIG. 2. The intermittent member rotates the detent counterclockwise about its pivot 24 when the intermittent member is rotated counterclockwise about its pivot 68 by the operating lever 76. Should the bolt 18 be in an intermediate latched position or a fully latched position, FIG. 5, with the foot 26 of the detent in engagement with either shoulder 28 or 30 of the bolt, respectively, counterclockwise rotation of the detent will release the detent foot from the engaged bolt shoulder to permit the door to be opened as the striker pin rotates the bolt to its unlatched position, as shown in FIGS. 1 to 4. The foot 26 of the detent 22 rests on the edge 84 of the leading leg of bolt 18. When the door is closed, the engagement of the striker pin with this leading leg rotates the bolt to intermediate or fully latched positions wherein the striker pin is trapped in the bolt throat and the detent foot 26 engages either shoulder 28 or shoulder 30, respectively.

Should the locking lever be in its locked position, clockwise of its position shown, the leg 78 of the intermittent member will move to the left, as viewed in FIG. 2, and out of abutting relationship to the lower edge of the tab 80 so that rotation of the operating lever 76 will not have any effect on the detent 22.

As shown in FIGS. 1, 2 and 3, the lefthand end of the operating lever 76 includes an opening which slidably receives the upper end of a pin 86, the lower shouldered end of which is staked to a tab 88 of back plate 40. A coil spring 90 surrounds the pin 86 and seats between the shouldered end of the pin and the lower surface of lever 76 to continually bias the lever 76 clockwise about its pivot 82.

The hooked upper end of a transfer rod 92 is received in a slot 94 of lever 76, FIG. 1. The lower end of the rod 92 is bent laterally and secured by a conventional spring clip to one offset leg 96 of a bell crank transfer lever 98. The lever 98 is pivoted at 100 to an integral lateral ear or arm 102 of the frame 12. The other leg 104 of the transfer lever 98 rotatably mounts a stud 106 which threadedly receives the lower threaded end of a rod 108. The rod 108 extends upwardly and is connected to a conventional outside operator or door handle, not shown, which is mounted on the outer panel of a vehicle body door.

As best shown in FIG. 1, the lever 98 includes an integral narrow bendable tab 110 having a terminal lateral flange which is engageable with an edge of the ear 102 to locate the lever 98 in a counterclockwise direction relative to the ear.

When the lever 98 is rotated counterclockwise, FIG. 1, by the outside handle through downward shifting of the rod 108, the rod 92 shifts vertically and rotates lever 76 counterclockwise about pivot 82.

An inside release handle or operator, not shown, is connected by a rod 112, FIG. 1, with an inside release lever 114 which is pivoted at 116 to an offset lateral flange or ear 118 of back plate 40. The lever 114 includes a lateral tab 120 which underlies a lateral tab 122 of the operating lever 76. Rotation of the lever 114 in a counterclockwise direction, as viewed in FIG. 1, by the inside handle or operator rotates the lever 76 counterclockwise about its pivot 82.

It will be noted that rotation of the lever 76 by the rod 92 occurs without rotation of the lever 114 and likewise rotation of the lever 76 by the lever 114 occurs without any movement of the rod 92.

The foregoing is a brief description of the manner in which the basic structure of the lock operates. A more complete description can be found in Ser. No. 673,673, Adams et al, Vehicle Closure Latch, filed Nov. 21, 1984 and assigned to the assignee of this invention.

Referring now to FIGS. 1 and 3 through 5 of the drawings, the control means 124 of this invention is a self-contained module which can be added to the door latch 10 without modification of the operating components thereof.

Figure 4:
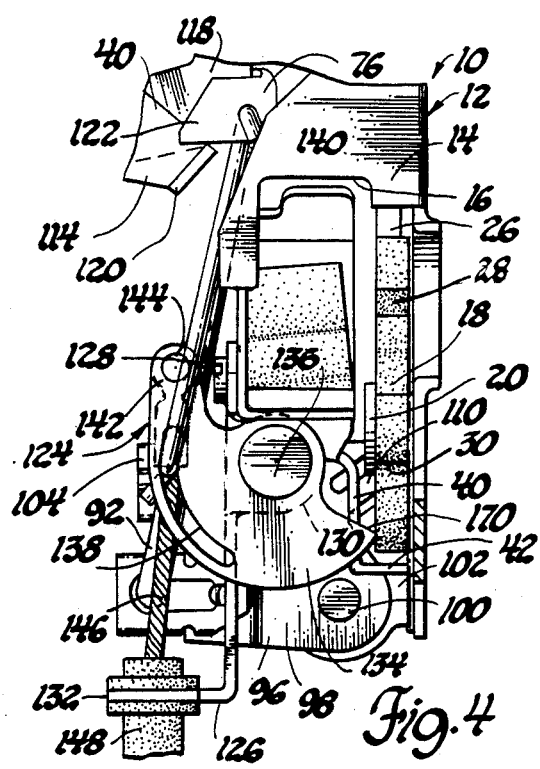
FIG. 4 is a view taken along line 4—4 of FIG. 3.

The control means 124 includes a bracket 126 which is secured to the back plate 40 by screws 128. The bracket 126 includes a lateral leg 130 and a slotted lower lateral tab 132. A sector shaped latch bolt sensor 134 is pivoted at 136 to the leg 130. The sensor includes an arcuate closed end slot 138 therethrough which receives the lower bent end of a rod 140. The hook shaped upper end of the rod 140 is hooked through the lateral tab 122 of the operating lever 76 as best shown in FIGS. 4 and 5.

The sensor 134 includes an extension 142 which is pivoted at 144 to an eyelet on the upper end of a cable 146. A sheath 148 surrounds the cable and has its upper end mounted to the slotted tab 132. As schematically shown in FIG. 1, the lower end of the cable 146 is pivoted at 149 to a lever 150 which is pivoted at 152 to the frame of a conventional door mounted inertia retractor 154 for either the lap or shoulder belt portion of a conventional passive seat belt arrangement. A leaf spring 156 is fixed to the pivot 152 for movement with the lever 150 as a unit whenever the cable 146 is shifted by the sensor 134. The leaf spring 156 is normally spaced from a pilot pawl 158 of the retractor 154 when the sensor 134 is in an unactuated position, as shown in FIGS. 1 to 3 and 5, and resiliently bears against the pilot pawl to inhibit pivotal movement of the pilot pawl about pivot 160 when the sensor is in actuated position, FIG. 4. The pilot pawl 158 engages a gear wheel 162 when pivoted clockwise by the pendulum 164 of the retractor to in turn engage the main pawl 166 of the retractor with the reel teeth 168. The engagement of the leaf spring 156 with the pilot pawl 158 provides a counterclockwise bias on the pilot pawl which disables clockwise movement of the pilot pawl under the action of the pendulum. The retractor 154 forms no part of this invention and is in current production use on vehicles manufactured by the assignee of this invention.

Figure 5:
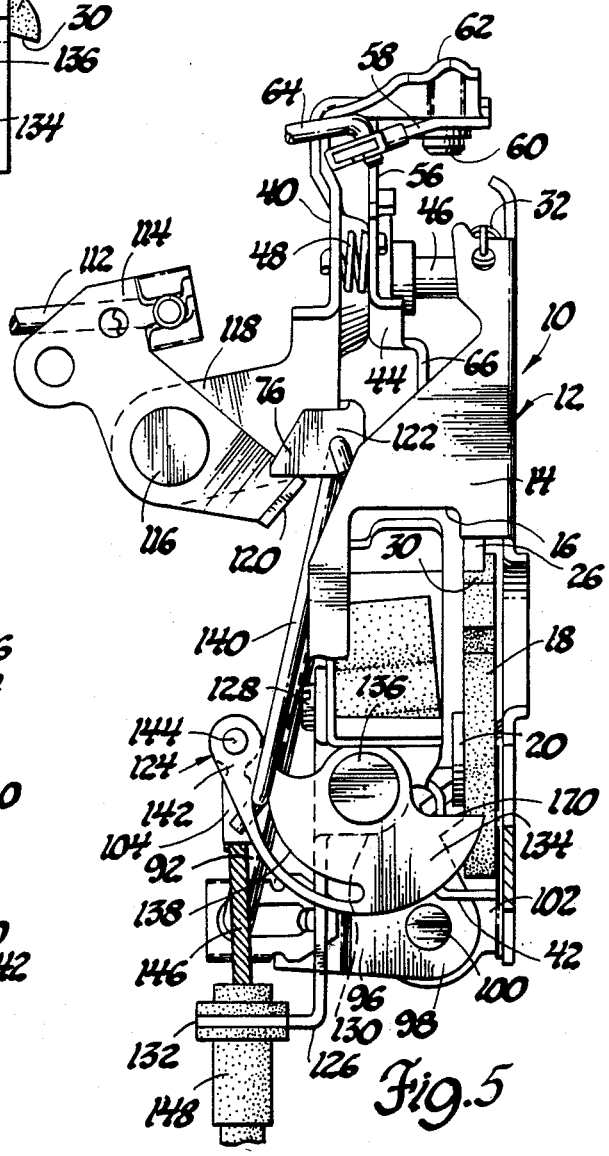
FIG. 5 is a view with the latch bolt in latched position.

When the latch bolt 18 is in latched position as shown in FIG. 5, the latch bolt sensor 134 is located in unactuated position with a shoulder 170 thereof in the path of movement of the latch bolt. The lower end of the rod 140 is located at the upper closed end of the arcuate slot 138 as shown in FIG. 5. Movement of the operating lever 76 of the latch 10 by either the outside operator or the inside operator will rotate the sensor 134 clockwise about pivot 136 from its unactuated position of FIG. 5 to its actuated position of FIG. 4. This shifts the cable 146 upwardly to engage the leaf spring 156 with the pilot pawl 158 of the retractor 154 and disable the retractor. When either the inside or outside operator is released, the latch bolt sensor 134 returns to its unactuated position, if latch bolt 18 is in latched position.

When the operating lever 76 is actuated by either the inside or the outside operator and the intermittent member 70 is connected to the detent 22, the bolt 18 is released for movement from the latched position shown in FIG. 5 to the unlatched position shown in FIGS. 1 through 4. The latch bolt sensor 134 will be rotated by the inside or outside operator from the unactuated position of FIG. 5 to the actuated position of FIG. 4 to disable retractor 154 as previously described. As the latch bolt moves to unlatched position, the leading outboard leg of the latch bolt moves past the sensor 134 to block return movement of the sensor to unactuated position and maintain the sensor in actuated position when the inside or outside operator is released. The latch bolt will start to block movement of the sensor to unactuated position as shoulder 28 of the latch bolt moves slightly past detent shoulder 26 and will continue to block such movement of the sensor as the latch bolt continues to move to unlatched position. If the inside or outside operator is released slightly before the leading outboard leg of the latch bolt starts to block the sensor, the leading outboard leg of the bolt will engage the shoulder 170 of the sensor 134 and move the sensor to the unactuated position of FIG. 4 as the bolt continues to move to unlatched position and the outboard leg moves past the sensor. If the inside or outside operator is actuated and immediately released, the detent shoulder 26 may engage shoulder 28 of the latch bolt to stop movement of the latch bolt to unlatched position. The leading outboard leg of the bolt 18 cannot engage the shoulder 170 unless the latch bolt shoulder 28 has moved past the detent shoulder 26. This ensures that there will be no disablement of the retractor 154 unless the latch bolt is in an unlatched position.

Upon movement of the latch bolt 18 from the unlatched position of FIG. 4 to the latched position of FIG. 5, the sensor 134 will remain in its actuated position shown in FIG. 4 as the trailing outboard leg of the latch bolt slides relative to the sensor. When the outboard leg of the latch bolt moves past the sensor, the sensor is released from engagement therewith and moves from its FIG. 4 actuated position to its FIG. 5 unactuated position. This shifts the cable 146 downwardly to release the leaf spring 156 from engagement with the pilot pawl 158 of the retractor 134. The trailing outboard leg of the latch bolt will not move past the sensor until the latch bolt has moved to a position wherein the latch bolt shoulder 28 is moving past the detent shoulder 26. Thus as soon as the latch bolt shoulder passes the detent shoulder, the retractor 154 is operative.

Although the latch bolt sensor 134 is shown as operating the disabling means of the retractor through the cable 146, it should be noted that the sensor 134 could likewise actuate a switch or other electrical device to electrically actuate a solenoid or other device which would engage the leaf spring 156 with the pilot pawl 158.

The control means of this invention is of very simple construction and can be added to current production locks to accomplish its purpose in a very simple and expeditious manner.

Thus this invention provides an improved control means for a restraint belt retractor.

The embodiments of the invention in which an exclusive property or privilege is claimed are defined as follows:

1. In a vehicle body having a door movable between open and closed positions, latch means mounted on the door for selectively holding the door in closed position or permitting movement thereof to open position and including a latch bolt movable between latched and unlatched positions, operating means for releasing the latch bolt for movement to unlatched position and including a latch operating lever releasing the latch bolt for movement to unlatched position, restraint belt retractor means mounted on the door, and disabling means operable to disable the retractor, the combination comprising, a latch bolt sensor mounted on the latch means for movement between an unactuated position when the latch bolt is in latched position and an actuated position, wherein the sensor engages the latch bolt when the latch bolt is in unlatched position, first means connecting the sensor to the disabling means for operating the disabling means upon movement of the sensor to actuated position, a connecting member, second means connecting one end of the connecting member to the latch operating lever, third means connecting the other end of the connecting member to the sensor, one of said second and third connecting means including lost motion means connecting the connecting member and one of said lever and sensor in the unactuated position of said sensor and permitting free wheeling movement of the connecting member and said one of said lever and said sensor in the actuated position of said sensor, operation of the latch operating lever releasing the latch bolt for movement from latched position to unlatched position and moving the sensor to actuated position, the lost motion means permitting cessation of operation of the latch operating lever when the sensor is in the actuated position.

2. In a vehicle body having a door movable between open and closed positions, latch means mounted on the door for selectively holding the door in closed position or permitting movement thereof to open position and including a latch bolt movable between latched and unlatched positions, operating means for releasing the latch bolt for movement to unlatched position, restraint belt retractor means mounted on the door, and disabling means operable to disable the retractor, the combination comprising, a latch bolt sensor pivoted to the latch means for movement transverse of the latch bolt between an unactuated position when the latch bolt is in latched position and an actuated position, wherein the sensor engages the latch bolt when the latch bolt is in unlatched position, means operatively interconnecting the sensor and the disabling means for operating the disabling means upon movement of the sensor to actuated position, a connecting member, means connecting one end of the connecting member to the operating means, arcuate slot means in the sensor having at least one closed end and pivotally and slidably receiving the other end of the connecting member to provide a lost motion connection between the connecting member and the sensor, the other end of the connecting member moving into engagement with the closed end of the slot means upon operation of the operating means in the unactuated position of said sensor to (1) release the latch bolt for movement to unlatched position, and (2) move the sensor to actuated position to operate the disabling means, the other end of the connecting member moving out of engagement with the closed end of the slot upon cessation of operation of the operating means, the sensor being maintained in actuated position by engagement with the latch bolt.

3. In a vehicle body having a door movable between open and closed positions, latch means mounted on the door for selectively holding the door in closed position or permitting movement thereof to open position and including a latch bolt pivotable between latched and unlatched positions, operating means for releasing the latch bolt for movement to unlatched position and including an operating lever, restraint belt retractor means mounted on the door, and disabling means operable to disable the retractor, the combination comprising, a latch bolt sensor pivoted to the latch means for rotation in a plane transverse of the plane of movement of the latch bolt between an unactuated position when the latch bolt is in latched position and an actuated position, wherein the sensor engages the latch bolt when the latch bolt is in unlatched position, said sensor including an arcuate slot generated about the pivot of the sensor and having at least one closed end, means interconnecting the sensor and the disabling means for operating the disabling means upon rotation of the sensor to actuated position, a connecting rod having one end thereof connected to the latch operating lever and the other end thereof received in the sensor slot, said other end of said connecting rod moving into engagement with said closed end of said slot upon operation of said operating means in the unactuated position of said sensor to (1) rotate said sensor from unactuated position to actuated position and operate said disabling means and (2) effect release of the latch bolt for movement to unlatched position wherein the latch bolt is engageable by the sensor to maintain the sensor in actuated position upon cessation of operation of the operating means.

* * * * *